United States Patent
Mau

(10) Patent No.: US 7,933,785 B2
(45) Date of Patent: Apr. 26, 2011

(54) REAL-TIME BENEFITS SERVICE MARKETPLACE

(75) Inventor: Andreas Mau, Palo Alto, CA (US)

(73) Assignee: SAP AG, Walldorf (DE)

( * ) Notice: Subject to any disclaimer, the term of this patent is extended or adjusted under 35 U.S.C. 154(b) by 1219 days.

(21) Appl. No.: 10/619,748

(22) Filed: Jul. 15, 2003

(65) Prior Publication Data

US 2005/0015277 A1    Jan. 20, 2005

(51) Int. Cl.
G06Q 40/00    (2006.01)
(52) U.S. Cl. .............................................. 705/4; 705/3
(58) Field of Classification Search .................. 705/1–4, 705/7, 26, 35–39, 14
See application file for complete search history.

(56) References Cited

U.S. PATENT DOCUMENTS

| | | | |
|---|---|---|---|
| 5,655,085 A | 8/1997 | Ryan et al. | |
| 6,067,522 A * | 5/2000 | Warady et al. | 705/2 |
| 6,283,761 B1 * | 9/2001 | Joao | 434/236 |
| 2001/0037214 A1 | 11/2001 | Raskin et al. | |
| 2002/0007324 A1 * | 1/2002 | Centner et al. | 705/26 |
| 2002/0023212 A1 * | 2/2002 | Proudler | 713/164 |
| 2002/0049617 A1 | 4/2002 | Lencki et al. | |
| 2002/0049642 A1 * | 4/2002 | Moderegger et al. | 705/26 |
| 2002/0062322 A1 * | 5/2002 | Genghini et al. | 707/500 |
| 2002/0128879 A1 | 9/2002 | Spears | |
| 2002/0149616 A1 | 10/2002 | Gross et al. | |
| 2003/0009355 A1 * | 1/2003 | Gupta | 705/2 |
| 2003/0229522 A1 * | 12/2003 | Thompson et al. | 705/4 |
| 2004/0172268 A1 * | 9/2004 | Franklin et al. | 705/1 |

OTHER PUBLICATIONS

E-Benefits Inc. website. 1997 (downloaded from web.archive.org).*
Singerman, Fredric S. "The Impact of the Electronic Signatures Act on Plan Administration." Journal of Pension Benefits: Issues in Administration, Autumn 2000, vol. 8, Issue 1, pp. 3-8.*
MacSweeney, Gregory. "Billing system drives cross-sell efforts." Insurance & Technology. New York: Jun. 2003.vol. 28, Iss. 6; p. 23.*
"Microsoft Mastering. E-Commerce Development: Business to Business." Microsoft Press, Redmond, Washington. 2000. Ch. 6: "Overview of the Extensible Markup Language (XML)".*
DeBra, P.M.E., and Post, R. D. J; "Searching for Arbitrary Information in the WWW: the Fish-Search for Mosaic." (downloaded from web.archive.org).*
Tomsen, Mai-Ian; Killer Content: Strategies for Web Content and E-Commerce.; Addison Wesley Longman, Inc. Reading, Massachusetts; Apr. 2000; pp. 13; 129-133; and 177-180.*
E-Benefits Inc. website.*
"Interactive Software Unveils e-FORCE Employee @ccess; First Web-based Workforce Management Employee Self-Service App." Business Wire: Oct. 23, 2000, p. 0529.*
PCT Written Opinion and International Search Report, mailed Dec. 12, 2006, for International Application No. PCT/US04/22074 (9 pages).

(Continued)

Primary Examiner — James A Kramer
Assistant Examiner — Martin A Gottschalk
(74) Attorney, Agent, or Firm — Finnegan, Henderson, Farabow, Garrett & Dunner, LLP

(57) ABSTRACT

A method for managing employee benefits in real-time includes receiving, from an employer, requirements for benefits; transmitting the requirements to one or more benefits providers; receiving bids from the one or more benefits providers to satisfy the requirements for benefits; receiving, from the employer, an authorization to enroll benefits of a selected benefits provider from the one or more benefits providers; and transmitting the authorization to the selected benefits provider.

26 Claims, 6 Drawing Sheets

OTHER PUBLICATIONS

Singerman "The Impact of the Electronic Signatures Act on Plan Administration" Journal of Pension Benefits, pp. 3-8, Autumn, 2000, vol. 8.

O'Neal et al: , HR-XML Consortium Benefits Enrollment Recommendation, Feb. 26, 2003, pp. 121.

Source Medical TherepySource HIPAA Position Paper Health Insurance Portability and Accountability Act of 1996; Public Law 104-191, formerly the Kennedy-Kassenbaum Bill, pp. 1-12.

SAP Solution Brief mySAP™ Financials Next-Generation Intergration, Jun. 1, 2001.

THIN THIN/HCSC-Standard EDI 834 Companion Document ASC X12N Benefit Enrollment and Maintenance Version 4010 May 2003, pp. 1-9.

Zimdars, "HIPPA: The Electronic Transactions and Security Standards" HIPAA Transacthion and Secutiry Standards, pp. 1-4, May 23, 2001 http://echoman.com/knowledgesource/HIPAA_transaction_standards.htm.

QS Technologies HIPPA (unpdated Apr. 10, 2001) Flash: final HIPPA Security and Electronic Signature Rule Approved, pp. 1-8, http://www.qstechnologies.com/hipaa.htm.

CPSI Clear direction for healthcare HIPPA Standards for Electronic Transactions, Jan. 19, 2001, Mobile, AL.

Vawter et al:, "J2EE vs. Microsoft.net a comparison of building XML-based web services" The Middleware Company EJB, J2EE, and XML Web Services Expertise, Sun Microsystems, Inc., 2001, pp. 1-25.

National Electronic Data Interchage Transaction Set Implementation Guide, Benefit Enrollment and Maintenance 834 CS XI2N 834 (004010x095), ASC X12N, Insurance Subcommittee Implementation Guide, May 2000, pp. 1-163.

Concio White Paere on HIPAA Complaiance Issues & Management, pp. 1-23, 2001.

\* cited by examiner

```xml
<?xml version="1.0" encoding="UTF-8"?>
<BuyerResourceDoc>
 <Network> Marketplace
    <CpuSpeed>1.4</CpuSpeed>
    <Memory>256</Memory>
    <HardDisk>40</HardDisk>
    <OperatingSystem>Linux</OperatingSystem>
    <Task>JAVA</Task>
    <LeaseTime>20</LeaseTime>
    <Compensation>100</Compensation>
    <PerformFact>1.0</PerformFact>
 </Network>
 <ServiceAgreement> Standard
    <Description>
      As many transactions for as little money as possible
    </Description>
    <PricePerTransaction>10.00</PricePerTransaction>
    <Penalty>10.00</Penalty>
 </ServiceAgreement>
 <BenefitsServiceDocument>
    <Initiator>
      <Name>Mutual Life</Name>
      <Address>...</Address>
    </Initiator>
    <BenefitsService>
      <EnrollmentData> include X12.834 </EnrollmentData>
      <SpecialRules> 401k rules ... </SpecialRules>
      <PlanCosts> ... </PlanCosts>
    </BenefitsService>
    <MatchingRules>
      ...
    </MatchingRules>
 </BenefitsServiceDocument>
</BuyerResourceDoc>
```

FIG. 3

```
<soap-env:Envelope
xmlns:soap-env="http://schemas.xmlsoap.org/soap/envelope/"
xmlns:Marketplace="http://SAP/Marketplace">
<soap-env:Header>
<Marketplace:UniqueID>Maula</Marketplace:UniqueID>
<Marketplace:purpose>search</Marketplace:purpose>
<Marketplace:NodesDepth>3</Marketplace:NodesDepth>
</soap-env:Header>
<soap-env:Body>
  ...Network...
<Marketplace:UniqueID>MyID</Marketplace:UniqueID>
<Marketplace:CpuSpeed>1.4</Marketplace:CpuSpeed>
<Marketplace:Memory>256.0</Marketplace:Memory>
<Marketplace:HardDisk>10.0</Marketplace:HardDisk>
<Marketplace:OperatingSystem>Linux</Marketplace:OperatingSystem>
<Marketplace:Task>java</Marketplace:Task>
  ...ServiceAgreement...
                                              ...
  ...BenefitsServiceDocument...
                                              ...
</soap-env:Body>
</soap-env:Envelope>
```

FIG. 4

```
<soap-env:Envelope
xmlns:soap-env="http://schemas.xmlsoap.org/soap/envelope/"
xmlns:Marketplace="http://SAP/Marketplace">
<soap-env:Header>
<Marketplace:purpose>MatchMessage</Marketplace:purpose>
<Marketplace:UniqueID>MyMatch</Marketplace:UniqueID>
</soap-env:Header>
<soap-env:Body>
   ...Network...
<Marketplace:CpuSpeed>1.6</Marketplace:CpuSpeed>
<Marketplace:Memory>512.0</Marketplace:Memory>
<Marketplace:HardDisk>40.0</Marketplace:HardDisk>
<Marketplace:OperatingSystem>Linux</Marketplace:OperatingSystem>
<Marketplace:Compensation>100</Marketplace:Compensation>
<Marketplace:LeaseTime>5</Marketplace:LeaseTime>
   ...ServiceAgreement...
                          ...
   ...BenefitsServiceDocument...
                          ...
</soap-env:Body>
</soap-env:Envelope>
```

FIG. 5

```
<soap-env:Envelope
xmlns:soap-env="http://schemas.xmlsoap.org/soap/envelope/"
xmlns:Marketplace="http://SAP/Marketplace">
<soap-env:Header>
<Marketplace:purpose>MatchMessage</Marketplace:purpose>
<Marketplace:UniqueID>MyMatch</Marketplace:UniqueID>
</soap-env:Header>
<soap-env:Body>
   ...Network...
<Marketplace:CpuSpeed>1.6</Marketplace:CpuSpeed>
<Marketplace:Memory>512.0</Marketplace:Memory>
<Marketplace:HardDisk>40.0</Marketplace:HardDisk>
<Marketplace:OperatingSystem>Linux</Marketplace:OperatingSystem>
<Marketplace:Price>1.2</Marketplace:Price>
<Marketplace:Compensation>100</Marketplace:Compensation>
<Marketplace:LeaseTime>5</Marketplace:LeaseTime>
   ...ServiceAgreement...
                              ...
   ...BenefitsServiceDocument...
                              ...
</soap-env:Body>
</soap-env:Envelope>
```

FIG. 6

REAL-TIME BENEFITS SERVICE MARKETPLACE

TECHNICAL FIELD

The application relates to benefits administration.

BACKGROUND

Companies provide their employees with benefits in the form of benefits packages. These benefits may include health care insurance and life insurance. Benefits services companies supply these benefits to employers. In the realm of health care, employers have a growing number of different kinds of benefits packages from which to choose.

Increases in health care costs, for example, have resulted in higher health care plan premiums for employers. These rising costs require new controls by employers. These controls include reviewing data and information about health care plans currently being provided to employees, obtaining information about different health care benefits options, sharing data internally and externally, utilizing all information to make better decisions, going to market at any time, and obtaining real-time market data.

Third party vendors can provide services to assist employers with implementing the foregoing controls.

SUMMARY

In general, in one aspect, the invention is directed to a method for managing employee benefits in real-time. The method includes receiving, from an employer, requirements for benefits; transmitting the requirements to one or more benefits providers; receiving bids from the one or more benefits providers to satisfy the requirements for benefits; receiving, from the employer, an authorization to enroll benefits of a selected benefits provider from the one or more benefits providers; and transmitting the authorization to the selected benefits provider. This aspect may include one or more of the following features.

Receiving the authorization may include receiving an electronic signature from the employer. The method may also include receiving, from the employer, electronic payment for the benefits, receiving requests for payment for the benefits from the selected benefits provider, and transmitting electronic payment for the benefits to the selected benefits provider. The method may also include receiving a carrier receipt from the selected benefits provider, and/or transmitting a carrier receipt to the employer.

The benefits may include at least one of health care benefits, life insurance benefits, savings plans, stock option plans, pension plans, 401K plans, credit plans, flexible spending accounts, and claims processing for flexible spending accounts. Receiving and transmitting may be performed using a markup language, such as Extensible Markup Language (XML).

The method may include receiving, from the employer, a request to change benefits for the employee, and transmitting, to the selected benefits provider, the request to change benefits. The method may include receiving, from the employer, a request to stop benefits, and transmitting, to the selected benefits provider, the request to stop benefits.

Machine-readable media may store executable instructions that cause one or more machines to implement the method.

In general, in another aspect, the invention is directed to a system for managing employee benefits in real-time. The system includes an Enterprise Resource Planning (ERP) system to manage human resources information for a company with employees, and one or more computers to manage information for one or more benefits providers. At least one of the computers is configured to: receive, via a network and the ERP system, requirements for benefits services for an employee; transmit the requirements for benefits services, via the network, to the one or more of the computers managing information for one or more benefits providers; receive, via the network, bids to satisfy the requirements for benefits services from the one or more computers; transmit the bids to the ERP system via the network; receive, via the network and from the ERP system, an authorization to enroll the services of a selected benefits provider from the one or more computers; and transmit the authorization via the network to a computer managing information for the selected benefits provider.

In general, in another aspect, the invention is directed to a system for managing employee benefits in real-time. The system includes one or more computers managing information for one or more benefits providers, and an Enterprise Resource Planner (ERP) to manage human resources information for a company with employees. The ERP is configured to: obtain requirements for benefits; transmit, via the network, the requirements to the one or more computers; receive, via the network, bids to satisfy the requirements from the one or more computers; obtain an authorization to enroll the services of a selected benefits provider; and transmit, via the network, the authorization to a computer managing information for the selected benefits provider.

These and other embodiments may have one or more of the following advantages.

Some embodiments provide interfaces to currently existing Health Care Management (HCM) benefits and payroll administration systems used by employers for their employees. The interfaces provide access to benefits plan header data and details, as well as exact payroll deductions that are sent to the benefits provider as payments. The administrative and payment data can be processed through existing e-payment (electronic payment) service software to support data traffic in this business scenario. Such software is commercially available as e-payment service modules of mySAP Financials products from SAP AG of Walldorf, Germany.

Some embodiments allow companies to participate in e-benefits procurement (electronic benefits procurement). Such services allow a company to choose freely between different insurance companies and other benefits providers through a benefits broker. Companies also can exchange information with a provider of choice directly. These services offer multiple functions, such as selection, enrollment, and administration processes. E-benefits procurement offers real-time marketplace services, such as provider auctions and additional World Wide Web (hereinafter, simply "Web") hosting services. Provider auctions allow health care providers to compete freely for a specific employer request with their offerings. As a result, the employer obtains the best bid for the services the employer requires.

Some embodiments provide Web-based access to benefits information and allow changes to be made to any benefits plan. Examples of these changes include changing providers and adding, deleting or changing benefits plans.

The system described herein further is able to link to back-end systems and/or third party systems. The back-end systems, such as financial applications, can update information in real-time, e.g., pay deductions for additional services. The third party systems, e.g., service providers, brokers or benefits providers, can update records in real-time. Services can be configured by an employer to meet its needs or by a third party service provider.

Other features and advantages will be apparent from the description, the drawings, and the claims.

DESCRIPTION OF THE DRAWINGS

FIGS. 3 to 6 are examples of XML documents.

Like reference numerals in different figures indicate like elements.

DETAILED DESCRIPTION

Figure 1:
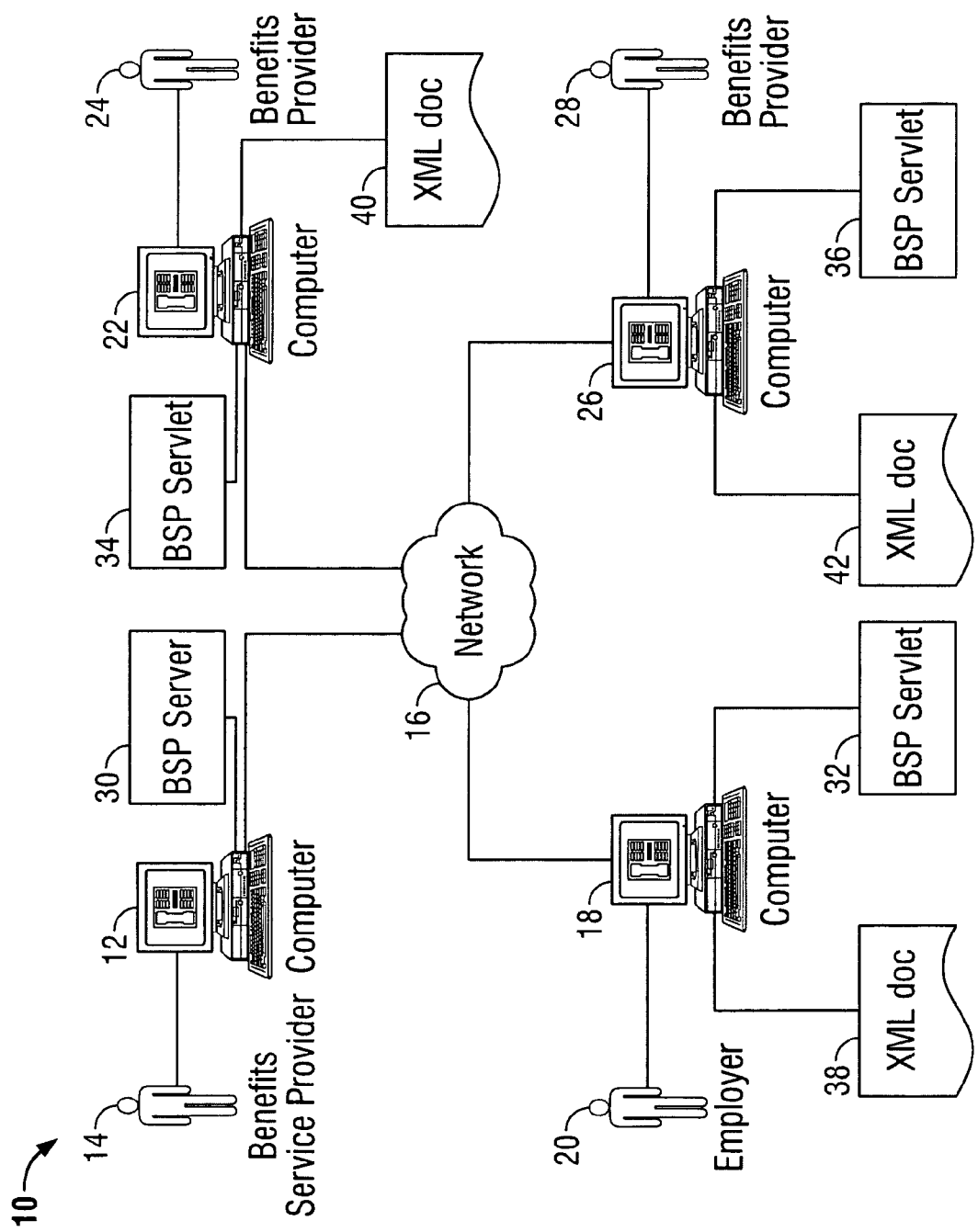
FIG. 1 is a block diagram of a distributed computer system supporting benefits administration with auctioning.

Referring to FIG. 1, system 10 shows a computer network, over which a benefits service provider, employers, and benefits providers communicate. Employer 20, benefits provider 24, and benefits provider 28 are trading or business partners in benefits. What this means is that the employer obtains benefits for its employees from one or both of benefits providers 24 and 28. Benefits service provider 14 may be a third party vendor that facilitates auctioning for benefits by benefits providers 24 and 28 to meet the needs of employer 20. Alternatively, benefits service provider 14 may be affiliated with employer 20.

Computer network 10 includes several computers. Computer 12, which is managed by benefits service provider 14, is configured to communicate over network 16. In embodiments where benefits service provider 14 is affiliated with employer 20, computer 12 is coupled with an Enterprise Resource Planning (ERP) system of employer 20. An ERP system is used to plan allocation of resources within a company.

Computer 18 is managed by employer 20; computer 22 is managed by benefits provider 24; and computer 26 is managed by benefits provider 28. Computers 18, 22 and 26 are also configured to communicate over network 16.

System 10 includes benefits service provider (BSP) server 30 and BSP servlets 32, 34, and 36. BSP server 30 and BSP servlets 32, 34, and 36 are computer programs (i.e., executable instructions) that are installed on, and that run on, their respective computers. In this regard, BSP server 30 is installed on computer 12. Computers 18, 22, and 26 are installed with BSP servlets 32, 34, and 36, respectively.

BSP server 30 manages Web services for administrating benefits for employer 20 via auctioning by benefits providers 24 and 28. This process is described below.

Employer 20, benefits provider 24, and benefits provider 28 register with a Central Business Partner (CBP) Server. The CBP server may be a computer program and is not shown in FIG. 1, but may run anywhere on computer network 10, e.g., on computer 12. Employer 20, benefits provider 24, and benefits provider 28 perform registration to provide, to the CBP server, information, such as their names, postal addresses, electronic mail (e-mail) addresses, partner roles (e.g., employer or benefits provider), usernames, and passwords.

During installation of BSP servlets 32, 34, and 36, employer 20, benefits provider 24, and benefits provider 28 (which each constitute "business partners") each send their respective user information to the CBP server and request to be registered. In response, the CBP server issues a global unique identifier (GUID) to each business partner. The CBP server determines whether each business partner is already registered and, if the business partner is not registered, the CBP server registers the business partner.

After successful registration, the GUID issued by the CBP server is stored locally on each business partner's computer 18, 22, or 26. The GUID is used to identify each business partner during subsequent communications over system 10. The CBP server also initiates creation of a financial account or store of financial information, such as secured bank account information. Once this is completed, the business partner becomes a member of system 10.

Providing Employee Benefits

Figure 2:
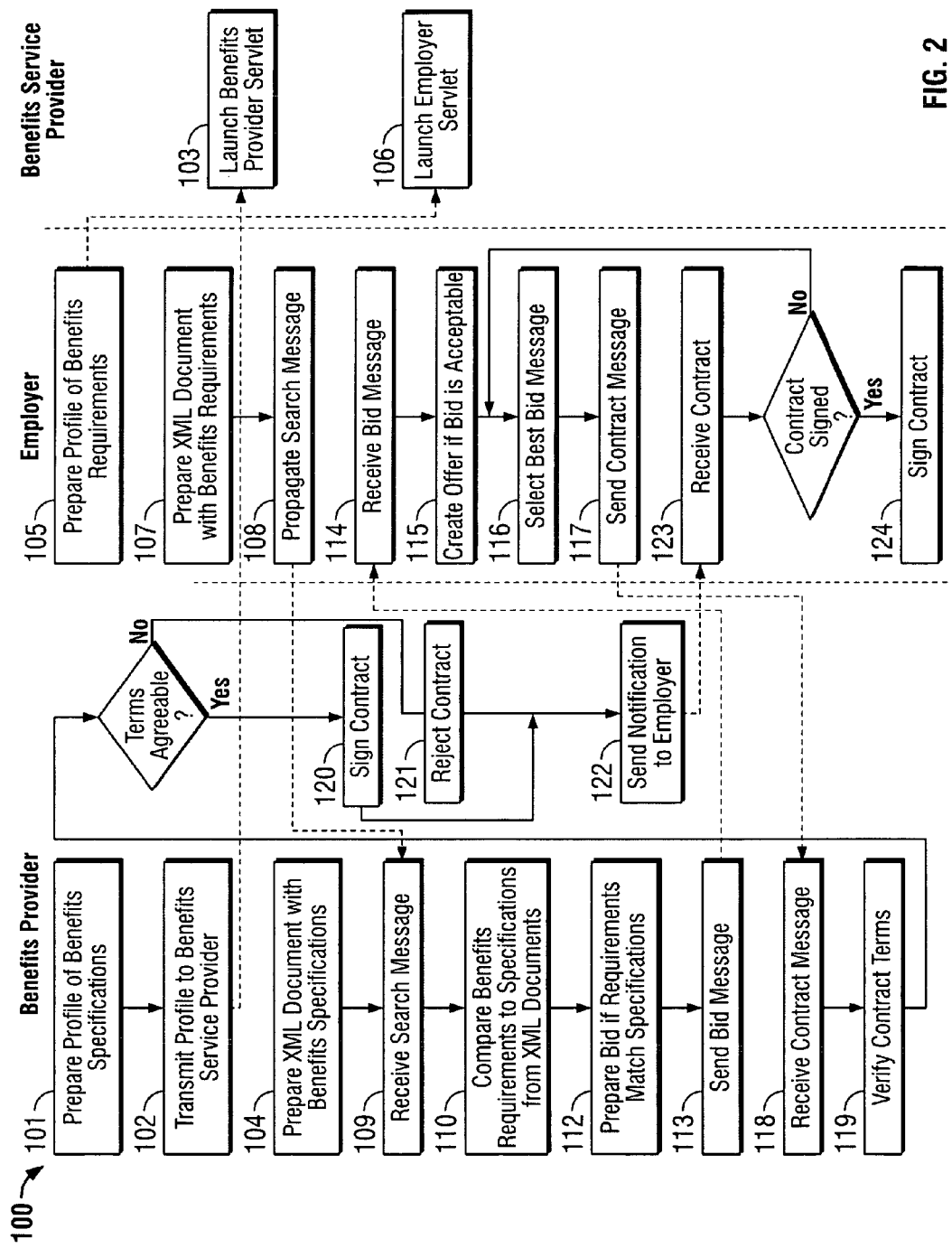
FIG. 2 is a flowchart showing a benefits auctioning process.

FIG. 2 shows a process 100 that is used by system 10 to provide employee benefits from benefits provider 24 to employer 20. Process 100 enables an employer to obtain benefits package(s) from benefits providers 24 and 28, which the employer may offer to its employees. In this embodiment, process 100 is implemented by hardware and software running on the various computers of system 10. Process 100 may be implemented on fewer computers than are shown in FIG. 2 (e.g., on one or two computers), or using more computers than are shown. In FIG. 2, the functions shown in the column labeled "Benefits Provider" are performed by software running on the benefits provider's computer 22; the functions shown in the column labeled "Employer" are performed by software running on the employer's computer 18; and the functions shown in the column labeled "Benefits Service Provider" are performed by software running on the BSP's computer 12.

In process 100, a benefits provider (in this example, benefits provider 24) prepares (101) a profile. The profile is a document or set of documents specifying benefits that are available from benefits provider 24. Benefits provider 24's profile is described in further detail below. The completed profile is transmitted (102) to BSP server 30. BSP server 30 uses network data in benefits provider 24's profile to launch (103) benefits provider 24's BSP servlet 34.

BSP servlet 34 prepares (104) eXtensible Markup Language (XML) documents 40 containing information, including a benefits specification extracted from benefits provider 24's profile. Use of the XML documents is described below.

Employer 20 also prepares (105) a profile. The employer's profile includes benefits requirements for one or more employees within its organization. Employer 20's profile is described in further detail below. Employer 20 submits the profile to BSP server 30. BSP server 30 uses network data in employer 20's profile to launch (106) employer 20's BSP servlet 32. Employer 20's BSP servlet 32 prepares (107) XML document(s) 38 containing information, including benefits requirements extracted from employer 20's profile.

Employer 20's BSP servlet 32 propagates (108) a search message from the XML document 38 via network 16. The search message is broadcast over system 10 to request the benefits requirements specified in employer 20's profile. BSP servlet 34 receives (109) the search message. Other servlets, such as BSP servlet 36, also receive the message and act accordingly; however, for illustration, we focus on BSP servlet 34.

BSP servlet 34 compares (110) requirements in the search message against benefits specified in its XML document 40. The comparison is described in more detail below. If the requirements match the benefits, BSP servlet 34 prepares (112) a bid based on the search message, and sends (113) a bid message to employer 20's BSP servlet 32. Briefly, the bid message includes a description of benefits offered by the benefits provider plus a price for those benefits. The bid message is described in more detail below.

BSP servlet 32 receives (114) the bid message from BSP servlet 34. BSP servlet 32 determines if the bid is acceptable using criteria specified by employer 20. If the bid is determined to be acceptable, BSP servlet 32 creates (115) an offer using the bid message, and submits the offer to employer 20's local negotiation/contracting (e.g., ERP) system (not shown). The offer is described in more detail below. Employer 20's local negotiation/contracting system may be running on computer 18 or on another computer.

The search/bid process described above also occurs with benefits provider 28/BSP servlet 36.

Employer 20's local negotiation/contracting system sorts the bid message from BSP servlet 34 and any other bids received (e.g., from BSP servlet 36). The sorting is performed according to criteria selected by employer 20 in order to determine the "best" bid from the employer's perspective. This sorting is described in more detail below.

If employer 20's local negotiation system selects (116) the bid received from BSP servlet 34 as the best bid (based on the sorting), then its local negotiation/contracting system sends (117) a contract message to BSP servlet 34. The contract message includes a "Request For Contract" XML document. The Request For Contract XML document includes price and payment terms for the benefits offered in the bid. The contract message also includes a query asking BSP servlet 34 if benefits provider 24 is ready to close the offer made in the Request For Contract XML document.

Employer 20 may negotiate a price with benefits provider 24 before sending the contract message. Negotiation may be one-on-one. Employer 20 and benefits provider 24 exchange messages and agree to a final contract via the negotiation. A process for performing the negotiation is described below.

BSP servlet 34 receives (118) the contract message. BSP servlet 34 verifies (119) the terms of contract and whether the terms of contract agree with the terms in benefit service provider 24's profile of benefits. If the terms of contract agree, then BSP servlet 34 signs (120) the contract, indicating its willingness to make a deal. Otherwise BSP servlet 34 rejects (121) the contract. Either way, BSP servlet 34 notifies (122) BSP servlet 32.

BSP servlet 34 may sign the contract using an electronic signature. The Federal Electronic Signatures in Global and National Commerce Act, signed into law on Jun. 30, 2000, provides electronic transactions the same legal status as pen-and-paper transactions by providing a consistent national framework for electronic signatures and transactions. This allows electronic signatures to be used in the employee benefits administration system described herein.

BSP servlet 32 receives (123) either a rejected contract message or a signed contract message. If the message is a signed contract message, BSP servlet 32 signs (124) the contract and sends the contract back to BSP servlet 34 for verification. The signature may be electronic. If the message is a rejected contract message, then BSP servlet 32 starts the above-described contracting process with the next best benefits provider (e.g., benefits provider 28) until a contract is made with one benefits provider.

If a contract is made with benefits provider 24, BSP servlet 34 logs the contract with a local financial agent for benefits provider 24. Likewise, BSP servlet 32 logs the contract with a local financial agent for employer 20. Logging the contract may be performed electronically. Both local financial agents submit the resulting contract to a central financial server agent for benefits service provider 14. Submission may be electronic. The central financial server agent for benefits service provider 14 collects fees for benefits service provider 14 by inspecting the contract.

The central financial server agent for benefits service provider 14 provides, electronically, all fees, payments and funds transfers between employer 20's account and benefits provider 24's account. These financial transactions are discussed in further detail below.

If a contract is not made with a benefits provider, employer 20 re-starts process 100 by propagating (108) new search messages. Process 100 then proceeds as above.

Profiles

The profile generated by benefits provider 24 above, and submitted to BSP servlet 34, includes network data and a benefits service provider agreement. The profile describes networking requirements, service product (benefits) needed, and other detail needed to find a matching employer.

The network data includes computational resources available for BSP servlet 34. The computational resources that may be specified include, for computer 22, central processing unit (CPU) power, fast/primary memory specifications, slow/secondary memory specifications, operating system specifications, and the version of the J2EE (Java 2 Platform, Enterprise Edition) software library installed on computer 22. The network data may also include the type of task to be executed, e.g., J2EE tasks and an underlying network grid environment (path, IP addresses) that may be needed to transfer the information to BSP servlets 34 or 36. The underlying network grid environment may include information about firewalls protecting computers 22 and 26. The network data may also includes the schedule time and the minimum amount of usage time for jobs in addition to the average performance of the system that is acceptable (determined from benchmarking certain performance characteristics, such as integer and float point arithmetic operations and their network connection speed, etc).

The benefits service provider agreement may include benefits specification and rules, benefits service provider fee payment type and mode, a maximum benefits service provider fee per second/transaction to be paid for an auctioning task, and benefits service provider penalties, including credit granted or demanded for not honoring a contract.

The profile generated by employer 20, and submitted to BSP servlet 32, includes much of the same data as the profile generated by benefits provider 24, except that benefits requirements are included instead of benefits specifications.

Bid Messages and Offers

Trading proposal documents are used by BSP servlets 34 and 32 to create bid messages from benefits provider 24 and offers from employer 20, respectively. These trading proposal documents include initiator information (employer/benefits provider) including a GUID, data about the benefits including benefits enrollment data (administration data); benefits plan data (e.g., rules and plain text descriptions), and quantifiable parameters, such as costs. The trading proposal documents also include sort criteria and matching rules for use in comparing offers and bids.

Employer 20 and benefits providers 24 and 28 express the benefits specifications and requirements in the trading proposal documents in a standard format that all participants in system 10 can understand. XML documents may be used to describe trade proposals of employer 20 and benefits providers 24 and 28. XML documents are plain text, and thus are platform independent. Any platform that can read ASCII text has the ability to read an XML document.

Graphical User Interfaces (GUIs) in system 10 may be used on the various computers of system 10 to input and receive information. The GUIs may be created using the JAVA Swing application programming interface (API). All the fields entered take their respective default units. For example, FIG. 3 shows a trade proposal XML document created by such a GUI. Furthermore, FIG. 4 shows an example search message in XML format; FIG. 5 shows an example match message; and FIG. 6 shows an example contract message.

XML Schemas provide means of expressing trade proposals and contracts in system 10. These schemas provide the templates used to describe the documents. These templates describe the formats to express the role of the business partner (e.g., employer or benefits provider), basic information, and proposal/contract information. BSP server 30 and BSP servlets 32, 34, and 36 use a set of rules when generating or parsing the XML documents.

Generation of XML documents to describe the trade proposal/contract requires little effort on the user's part. The API implementations to generate XML documents could use Java Document Object Model (JDOM) and a GUI could use Java swing for easy implementation. JDOM is a Java-based solution for accessing, manipulating, and outputting XML data from Java code. While JDOM interoperates well with existing standards such as the Simple API for XML (SAX) and the Document Object Model (DOM), it is not an abstraction layer or enhancement to those APIs. All of these tools are a subset of J2EE.

Matching Requirements

As described above, BSP servlet 32 compares (110) requirements in a search message against a specification of benefits in XML document 40. This matching uses maintenance and generation of search lists.

For optimal maintenance and generation of search lists, a method is used which generates and maintains a list of search results per installed computer (e.g., computers 18, 22, 26). This method includes download of an existing search list at the time of registration with system 10. This list can be modified and should be limited so as not to overload the network with redundant data and to limit message traffic in general. To prevent overload, a parameter, called "Number Of Legs" (NOL), may be included in the search message. This parameter controls the number of nodes a trade proposal can travel to in the marketplace network. Node operators are able to configure this parameter through a node configuration API.

When a node receives a search message, it decreases the NOL by one and, if the NOL is not zero, propagates a search message. By setting the NOL to a maximum number of hops to be traveled, the depth of propagation in system 10 is controlled.

Since it is possible to receive redundant messages in system 10, a unique identifier for each proposal/contract is assigned so that matching systems can ignore duplicate messages. The search messages add path information as they travel to various nodes. This path information is used later to reimburse all nodes along the path for propagating the search requests. This reimbursement provides incentive for business partners 20, 24, and 28 to tune their BSP servlets 32, 34, and 36 for optimal distribution of search messages.

BSP servlet 34 compares the requirements in the search message against the specification of benefits in XML document 40 when the bid prepared by the employer 20's trade proposal document matches the offer prepared by benefits provider 24's trade proposal document. The match is achieved when the bid and offer are compared according to the rules defined by each party to match the proposals.

A match making algorithm is used to determine this match. The match making algorithm utilizes rule based comparisons between structured and unstructured data sources for matching trade proposals. All standard comparisons for match making procedures are used by this match making algorithm. For example, one rule states that price compatibility is achieved if a bid price "BPRI" is at least some percentage "PERC" % greater than an offer price "OPRI". Thus, PERC defines the percentage that the prices may differ from each other. If a bid and offer are compatible in all conditions defined by the comparison rules (or some subset thereof), an indication of "matching" will be output by the matching system.

Sorting Bids

As described above, employer 20's local negotiation/contracting system sorts a bid message and any other bid messages received according to criteria chosen by employer 20 in order to select the best bid (116). A sort algorithm is used to sort matches and to find the best bid for the defined purpose. The XML documents 38, 40, and 42 for the trade proposals can contain many parameters, some of which are related. Therefore, each business partner 20, 24, and 28 contains common sort criteria.

Negotiation

Negotiation between employer 20 and a benefits provider may be performed as follows. Employer 20 initiates the negotiation phase by sending benefits provider 24 the Request For Contract XML document, which may include the price, payment type, and contract terms specified in the original trade proposal documents. A status element is attached to the Request For Contract XML document. This status element may be changed by benefits provider 24 as negotiations continue.

Benefits provider 24 verifies the Request For Contract XML document to confirm that the specified parameters match its proposal. If everything in the Request For Contract XML document sent by employer 20 matches the benefits provider's benefits specifications, the status element of the document is set to "Accepted" and the document sent back to employer 20. If there are any differences between the Request For Contract XML document and the benefits provider's benefits specifications, the status element of the document may be set to "Rejected" and the document is sent back to employer 20. Any amendments or changes will be marked "Amended/Changed", provided that the changes match employer 20's proposal.

Employer 20 receives a document, in which the status is either "Accepted" or "Rejected". If the status is "Accepted", employer 20 electronically signs the contract and sends the contract back to benefits provider 24. If the status is "Rejected", employer 20 can pick the next best benefits provider (e.g., benefits provider 28) and repeat the process (or send an addendum with status "Amended/Changed" to match benefits provider 24's proposal more closely).

If benefits provider 24 receives a signed contract document, benefits provider 24 also signs the contract. Thereafter, the status of the contract is set to "Closed" and the proposal converted into a contract. Both benefits provider 24 and employer 20 inform benefits service provider's BSP server 30 of the contract, which controls exchange of financial information and which automatically stores a record for future payment and reference purposes.

The financial system that manages the financial transactions described above can keep a transactional history of the employer and benefits providers. A database records this transaction history. The financial system accrues or deducts all the payments from the accounts of employer 20, benefits provider 24, or benefits provider 28 each time a successful transaction takes place, without accessing the external financial networks. The financial system also manages transaction fees in system 10. This account information is used to make transactions with existing financial networks to debit or credit the accounts of employer 20, benefits provider 24, or benefits provider 28, as needed.

Protocols

In system 10, the Simple Object Access Protocol (SOAP) may be used as the messaging mechanism to handle transmission and receipt of data between BSP servlets 30, 32, 34, and 36. SOAP is an XML based protocol that includes three parts:

(1) an envelope that defines a framework for describing what is in a message and how to process it, (2) a set of encoding rules for expressing instances of application-defined data types, and (3) a convention for representing remote function procedure calls and responses.

SOAP is a stateless, one-way message exchanging paradigm, but applications can create more complex interaction patterns (e.g., request/response and request/multiple pattern) by combining such one-way exchanges with features provided by an underlying transfer protocol and application-specific information. The Java API for XML Messaging (JAXM) Optional Package is used to send and receive document oriented XML messages. JAXM implements Simple Object Access Protocol (SOAP) with attachments messaging so that software engineers can focus on building, sending, receiving, and decomposing messages for applications, instead of programming low level XML communications routines. SOAP is used to frame search messages, match messages, and contract messages.

In system 10, searching, matching, and contract messaging may be performed via Web service protocols that are accessible via SOAP. Web services enable the trading partners of system 10 to conduct business over the Web. Web services can be defined as a collection of functions packaged as a single entity and published to a network for use by other programs. Web services are building blocks for creating open distributed systems and allow companies and individuals to quickly and cheaply make their digital assets available worldwide. In one embodiment, Web service may be implemented as follows.

Benefits service provider 14 creates, assembles, and deploys the Web service using a programming language, middleware, and platform. Benefits service provider 14 defines the Web service in a document, which may be written in Web Services Description language (WSDL). The WSDL document describes the Web service to others. Benefits service provider 14 registers the service in Universal Description, Discovery, and Integration (UDDI) registries. UDDI enables the publication of Web services and thereby enables other software to search for these Web services. A prospective user finds the service by searching a UDDI registry. The user's application binds to the Web service and invokes the service's operations using SOAP. SOAP offers an XML format for representing parameters (as noted) and return values over Hyper Text Transfer Protocol (HTTP).

In some embodiments, the Web services use software conforming to J2EE. In other embodiments, the Web services use software conforming to Microsoft.NET. The Web services enable communication in real-time between the business partners on network 10, labeled 20, 24, and 28.

Real-time communications typically are those communications that elicit an immediate response. In a real-time mode, a sender sends a request to a receiver, either directly or through a switch (clearing-house), and remains connected while the receiver processes the request and returns a response to the original sender. Typically, response times range from a few seconds to around thirty seconds, and generally do not exceed one minute. The scope of the term "real-time", however, is not limited to these response times.

Other Embodiments

The benefits service marketplace described herein is not limited to use with the hardware and software of FIGS. 1 to 6; it may find applicability in any computing or processing environment and with any type of machine that can run machine-readable instructions, such as a computer program.

The benefits service marketplace may be implemented in hardware, software, or a combination of the two. The benefits service marketplace may be implemented using computer programs executing on one or more programmable computers that each include a processor, a storage medium readable by the processor (including volatile and non-volatile memory and/or other storage elements).

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to implement the system. The benefits service marketplace may also be implemented as computer-readable storage media, configured with computer program(s), where, upon execution, instructions in the computer program(s) cause the computers to implement the functions described herein for administering benefits.

The invention is not limited to the embodiments set forth herein. For example, the blocks in FIG. 2 may be rearranged and/or one or more of the blocks may be omitted. The features described above may be used with systems other than the benefits service marketplace described herein The commands, documents, and protocols used herein are merely representative; others may be used. The features shown in FIGS. 1 to 6 can be modified to accommodate alternative systems, networks, and protocols.

Other communications can be transmitted, such as a request, from an employer to a benefits provider, to stop providing benefits. Carrier receipts may also be provided, e.g., in response to payment or to confirm communications.

Examples of benefits that may be managed via system 10 include, but are not limited to, health care benefits, life insurance benefits, savings plans, stock option plans, pension plans, 401K plans, credit plans, flexible spending accounts, and claims processing for flexible spending accounts.

The invention is not limited to the embodiments set forth herein. Other embodiments are also within the scope of the following claims.

What is claimed is:

1. A computer-implemented method for providing a distributed service marketplace, the method comprising:
   receiving, from a user, requirements for services;
   electronically preparing a search message including the requirements for services;
   transmitting the search message to one or more service providers;
   automatically receiving bids from the one or more service providers that satisfy the requirements for services;
   sorting the received bids based on criteria selected by the user;
   automatically selecting a best bid from the received bids based on the sorting;
   automatically transmitting a contract document to the service provider associated with the best bid; and
   automatically receiving the contract document from the service provider associated with the best bid, wherein the contract document includes a status of at least one of accepted, rejected, and amended, wherein if the received contract document includes the status of rejected, then automatically selecting a next best bid from the received bids based on the sorting, and repeating the automatically transmitting and automatically receiving the contract document steps with the next best bid.

2. The method of claim 1, wherein if the received contract document includes the status of accepted, then the contract document further includes an electronic signature of the service provider associated with the best bid.

3. The method of claim 1, further comprising receiving, from the user, electronic payment for the services.

4. The method of claim 1, further comprising receiving requests for payment for the services from the service provider associated with the best bid.

5. The method of claim 4, further comprising:
receiving, from the user, electronic payment for the services; and
transmitting electronic payment for the services to the service provider associated with the best bid.

6. The method of claim 5, further comprising receiving a carrier receipt from the service provider associated with the best bid.

7. The method of claim 5, further comprising transmitting a carrier receipt to the user.

8. The method of claim 1, wherein the services comprise benefits including at least one of health care benefits, life insurance benefits, savings plans, stock option plans, pension plans, 401K plans, credit plans, flexible spending accounts, and claims processing for flexible spending accounts.

9. The method of claim 1, further comprising:
receiving, from the user, a request to change services; and
transmitting, to the service provider associated with the best bid, the request to change services.

10. The method of claim 1, further comprising:
receiving, from the user, a request to stop services; and
transmitting, to the service provider associated with the best bid, the request to stop services.

11. The method of claim 1, wherein the search message comprises networking requirements including at least one of memory specifications, operating system specifications, and type of task to be executed.

12. The method of claim 1, further comprising providing a reimbursement to each of the service providers that provided the bids.

13. A non-transitory computer-readable medium that store executable instructions for providing a distributed service marketplace, the instructions causing one or more processors to:
receive, from a user, requirements for services;
prepare a search message including the requirements for services;
transmit the search message to one or more service providers;
receive bids from the one or more service providers to satisfy the requirements for services;
sort the received bids based on criteria selected by the user;
automatically select a best bid from the received bids based on the sorting;
automatically transmit a contract document to the service provider associated with the best bid; and
automatically receive the contract document from the service provider associated with the best bid, wherein the contract document includes a status of at least one of accepted, rejected, and amended,
wherein if the received contract document includes the status of rejected, then automatically select a next best bid from the received bids based on the sorting, and repeating the automatically transmit and automatically receive the contract document steps with the next best bid.

14. The non-transitory computer-readable medium of claim 13, wherein if the received contract document includes the status of accepted, then the contract document further includes an electronic signature of the service provider associated with the best bid.

15. The non-transitory computer-readable medium of claim 13, wherein the instructions further cause a processor to receive, from the user, electronic payment for the services.

16. The non-transitory computer-readable medium of claim 13, wherein the instructions further cause the machine to receive requests for payment for the services from the service provider associated with the best bid.

17. The non-transitory computer-readable medium of claim 16, wherein the instructions further cause the machine to:
receive, from the user, electronic payment for the services; and
transmit electronic payment for the services to the service provider associated with the best bid.

18. The non-transitory computer-readable medium of claim 17, wherein the instructions further cause a processor to receive a carrier receipt from the service provider associated with the best bid.

19. The non-transitory computer-readable medium of claim 17, wherein the instructions further cause a processor to transmit a carrier receipt to the user.

20. The non-transitory computer-readable medium of claim 13, wherein the services comprise benefits including at least one of health care benefits, life insurance benefits, savings plans, stock option plans, pension plans, 401K plans, credit plans, flexible spending accounts, and claims processing for flexible spending accounts.

21. The non-transitory computer-readable medium of claim 13, wherein the instructions further cause a processor to:
receive, from the user, a request to change services; and
transmit, to the service provider associated with the best bid, the request to change services.

22. The non-transitory computer-readable medium of claim 13, wherein the instructions further cause a processor to:
receive, from the user, a request to stop services; and
transmit, to the service provider associated with the best bid, the request to stop services.

23. The non-transitory computer-readable medium of claim 13, wherein the search message comprises networking requirements including at least one of memory specifications, operating system specifications, and type of task to be executed.

24. The non-transitory computer-readable medium of claim 13, further comprising providing a reimbursement to each of the service providers that provided the bids.

25. A system for providing a distributed service marketplace, the system comprising:
an Enterprise Resource Planning (ERP) system to manage service information for a user; and
one or more computers to manage information for one or more service providers, at least one computer configured to:
receive, via the ERP system, requirements for services for the user;
prepare a search message including the requirements for services;

transmit the search message, via a network, to the one or more of the computers managing information for the one or more service providers;

receive, via the network, bids to satisfy the requirements for services from the one or more computers;

sort the received bids based on criteria selected by the user;

automatically select a best bid from the received bids based on the sorting;

automatically transmit a contract document to the service provider associated with the best bid; and automatically receive the contract document from the service provider associated with the best bid, wherein the contract document includes a status of at least one of accepted, rejected, and amended, wherein if the received contract document includes the status of rejected, then automatically select a next best bid from the received bids based on the sorting, and repeating the automatically transmit and automatically receive the contract document steps with the next best bid.

26. A system for providing a distributed service marketplace, the system comprising:

one or more computers managing information for one or more service providers;

an Enterprise Resource Planner (ERP) to manage service information for a user, the ERP being configured to:

obtain requirements for services;

prepare a search message including the requirements for services;

transmit, via a network, the search message to the one or more computers;

receive, via the network, bids to satisfy the requirements from the one or more computers;

sort the received bids based on criteria selected by the user;

automatically select a best bid from the received bids based on the sorting;

automatically transmit a contract document to the service provider associated with the best bid; and automatically receive the contract document from the service provider associated with the best bid, wherein the contract document includes a status of at least one of accepted, rejected, and amended, wherein if the received contract document includes the status of rejected, then automatically select a next best bid from the received bids based on the sorting, and repeating the automatically transmit and automatically receive the contract document steps with the next best bid.

\* \* \* \* \*